United States Patent
Gupta et al.

(10) Patent No.: US 8,223,633 B2
(45) Date of Patent: Jul. 17, 2012

(54) PORT TRUNKING AT A FABRIC BOUNDARY

(75) Inventors: Rajnish Gupta, Bangalore (IN); Nhan T. Pham, Fremont, CA (US); Amod K. Dani, Bangalore (IN); Ponpandiaraj Rajarathinam, San Jose, CA (US); Vineet Mathew Abraham, Sunnyvale, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 294 days.

(21) Appl. No.: 12/245,269

(22) Filed: Oct. 3, 2008

(65) Prior Publication Data

US 2010/0085981 A1  Apr. 8, 2010

(51) Int. Cl.
- G01R 31/08 (2006.01)
- H04L 12/28 (2006.01)
- G06F 15/177 (2006.01)
- G06F 11/00 (2006.01)

(52) U.S. Cl. ........ 370/228; 370/389; 370/409; 709/220; 714/4.3

(58) Field of Classification Search .................. 370/386, 370/419, 228, 389, 409; 709/220; 714/4.3
See application file for complete search history.

(56) References Cited

U.S. PATENT DOCUMENTS

| | | | |
|---|---|---|---|
| 4,782,483 A | 11/1988 | Lambert et al. |
| 5,282,202 A | 1/1994 | Bernstein et al. |
| 5,383,181 A | 1/1995 | Aramaki |
| 5,425,020 A | 6/1995 | Gregg et al. |
| 5,455,831 A | 10/1995 | Bartow et al. |
| 5,519,695 A | 5/1996 | Purohit et al. |
| 5,649,108 A | 7/1997 | Spiegel et al. |
| 5,649,110 A | 7/1997 | Ben-Nun et al. |
| 6,016,310 A | 1/2000 | Muller et al. |
| 6,104,696 A | 8/2000 | Kadambi et al. |
| 6,104,700 A | 8/2000 | Haddock et al. |
| 6,233,236 B1 | 5/2001 | Nelson et al. |
| 6,240,096 B1 | 5/2001 | Book |
| 6,275,492 B1 | 8/2001 | Zhang |
| 6,400,681 B1 | 6/2002 | Bertin et al. |
| 6,434,145 B1 | 8/2002 | Opsasnick et al. |

(Continued)

FOREIGN PATENT DOCUMENTS

EP  465090 A1  1/1992

(Continued)

OTHER PUBLICATIONS

"Fabric Shortest Path First Version 2" by Brocade Communication Systems, Inc. Revision 0.2, May 23, 2000.

(Continued)

*Primary Examiner* — Brandon Renner
(74) *Attorney, Agent, or Firm* — Wong, Cabello, Lutsch, Rutherford & Brucculeri LLP

(57) ABSTRACT

F_PORTs of an edge switch are logically trunking with N_PORTs of a node device outside the fabric via a trunked group of communications links. The trunked N_PORTs of the node device and the trunked F_PORTs of the edge switch are configured to send and receive frames of a particular stream across the multiple trunked links for in-order communication with the other device. The node device outside the fabric initially negotiates with the edge switch using a sequence of fabric login requests and fabric login acceptances to establish the trunked connection between the devices (and their respective ports).

38 Claims, 9 Drawing Sheets

U.S. PATENT DOCUMENTS

| | | | |
|---|---|---|---|
| 6,532,212 B1 | 3/2003 | Soloway et al. | |
| 6,549,541 B1 | 4/2003 | Sainio et al. | |
| 6,628,609 B2 | 9/2003 | Chapman et al. | |
| 6,647,017 B1 | 11/2003 | Heiman | |
| 6,678,248 B1 | 1/2004 | Haddock et al. | |
| 6,731,600 B1 | 5/2004 | Patel et al. | |
| 6,859,438 B2 | 2/2005 | Haddock et al. | |
| 6,865,153 B1 | 3/2005 | Hill et al. | |
| 6,941,252 B2 | 9/2005 | Nelson | |
| 7,286,527 B2 | 10/2007 | Yazdy | |
| 7,447,198 B1 | 11/2008 | Banks et al. | |
| 2002/0131456 A1 | 9/2002 | Lin et al. | |
| 2003/0147385 A1* | 8/2003 | Montalvo et al. | 370/389 |
| 2003/0172149 A1* | 9/2003 | Edsall et al. | 709/224 |
| 2005/0030948 A1 | 2/2005 | Wyatt | |
| 2005/0094649 A1 | 5/2005 | Varanasi et al. | |
| 2005/0152369 A1* | 7/2005 | Ambe et al. | 370/392 |
| 2005/0169258 A1* | 8/2005 | Millet et al. | 370/389 |
| 2005/0198523 A1 | 9/2005 | Shanbhag et al. | |
| 2007/0130295 A1* | 6/2007 | Rastogi et al. | 709/220 |
| 2008/0215910 A1* | 9/2008 | Gabriel et al. | 714/4 |
| 2009/0092043 A1* | 4/2009 | Lapuh et al. | 370/228 |

FOREIGN PATENT DOCUMENTS

| | | |
|---|---|---|
| WO | 9319550 A1 | 9/1993 |
| WO | 9807259 A1 | 2/1998 |

OTHER PUBLICATIONS

American National Standard for Information Systems, "Fibre Channel Fabric Generic Requirements (FC-FG) Rev. 3.5." Aug. 7, 1996.

Braden et al., Integrated Services in the Internet Architecture: an Overview, Network Working Group, RFC 1633, Jul. 1994, 28 pages.

Deficit Round Robin, 1 page, http://en.wikipedia.org/wiki/deficit__weighted__round__robin.

Dell Tape: Backup With Custom Barcodes, 4 pages, http://searchdatabackup.techtarget.com/generic/0,295582,sid187__gci1300168,00.html.

Differentiated Services, 7 pages, http://en.wikipedia.org/wiki/Differentiated__services.

Floyd et al.,, Link-sharing and Resource Management Models for Packet Networks, IEEE/ACM Transactions on Networking, vol. 3, No. 4, Aug. 1995, 22 pages.

I am 19374: Chapter 2 Virtual LANs and VLAN Trunking, 6 pages, http://ooteum.blogspot.com/2008/12/chapter-2-virtual-lans-and-vlan.html.

IEEE 802.1p, 1 page, http://en.wikipedia.org/wiki/IEEE__802.1p.

IEEE 802.1Q, 3 pages, http://en.wikipedia.org/wiki/IEEE__802.1Q.

Increasing Intelligence within the SAN fabric, Internet Citation, Jun. 2001, XP002251362, Retrieved from the Internet Aug. 14, 2003: URL:http://www.brocade.com/san.white__papers/pdf/IncreadingIntelligenceWithinSAN.pdf.

Overland Storage, Data Replication, 2 pages, http://overlandstorage.com/topics/Replication.html.

Rosenstein, Ariel, Storage Channel News: A Case for remote data replication, ArticleAlley.com, Sep. 28, 2006, 3 pages, http://searchstoragechannel.techtarget.com/news/article/0,289142,sid98__gci1219253.00.html.

Supplementary European Search Report for EP 02747985, dated Nov. 2, 2006, 4 pages.

TCP Session: Chapter 6, http://74.125.47.132/search?q=cache:tiPkgJqatWSAJ:research.microsoft.com/en-us/um/people/padmanab.thesis/sessions.ps.gz+%22TCP+SESSION%22+%22CHAPTER+6%22+%22PROS+AND+CONS%22&cd+1&hl=en&ct+clnk&gl=us&client+firefox-a, pp. 96-129.

* cited by examiner

PORT TRUNKING AT A FABRIC BOUNDARY

BACKGROUND

A storage area network (SAN) may be implemented as a high-speed, special purpose network that interconnects different kinds of data storage devices with associated data servers on behalf of a large network of users. Typically, a SAN includes high performance switches as part of the overall network of computing resources for an enterprise. The storage area network is usually clustered in close geographical proximity to other computing resources, such as mainframe computers, but may also extend to remote locations for backup and archival storage using wide area network carrier technologies. Fibre Channel networking is typically used in SANs although other communication technologies may also be employed, including Ethernet and IP-based storage networking standards (e.g., iSCSI, FCIP (Fibre Channel over IP), etc.).

As used herein, the term "Fibre Channel" refers to the Fibre Channel (FC) family of standards (developed by the American National Standards Institute (ANSI)) and other related and draft standards. In general, Fibre Channel defines a transmission medium based on a high speed communications interface for the transfer of large amounts of data via connections between varieties of hardware devices.

In a typical SAN, one or more Fibre Channel switches are used to communicatively connect one or more server devices with one or more data storage devices. Such switches generally support a high performance switching fabric and provide a number of communication ports for connecting via individual communication links with other switches, host servers, storage devices, or other SAN devices. However, if a communication link between one of the devices and the switching fabric becomes disabled (e.g., someone unplugs a link between a host and an edge switch of the switching fabric), the process of re-establishing communications for that device (e.g., for the host) can disrupt and introduce substantial delay in the data communications for that device. In addition, re-establishing communications can alter the identity by which the device is known by other fabric-connected devices. Furthermore, loss of a communications link can create bottlenecks in other communications links connecting the device to the fabric.

SUMMARY

Implementations described and claimed herein address the foregoing problems by logically trunking F_PORTs of an edge switch of a fabric and N_PORTs of a node device outside the fabric via a trunked group of communications links. Examples of node devices may include without limitation host bus adapters (HBAs), including multi-port HBAs, and virtualization devices. The trunked N_PORTs of the node device are configured to send frames of a particular stream across the multiple trunked links to arrive in-order at the trunked F_PORTs of the edge switch. Likewise, the trunked F_PORTs of the edge switch are configured to send frames of a particular stream across the multiple trunked links to arrive in-order at the trunked N_PORTs of the node device.

Such a trunking configuration between N_PORTs and F_PORTs increases the effective communications speed between node devices and the fabric. Furthermore, such trunking also increases the link utilization between the node devices and the edge switch, in that multiple end nodes may be communicating over multiple, shared trunked links.

The node device outside the fabric initially negotiates with the edge switch using a sequence of fabric login requests and fabric login acceptances to establish the trunked connection between the devices (and their respective ports). Through this negotiation, the edge switch also identifies a destination port identifier of a master F_PORT of the edge switch, which is logically shared by all of the trunked F_PORTs. This destination port identifier specifies a single Area for all of the trunked F_PORTs. As such, all frames arriving at the edge switch from the fabric are routed internally to a transmit queue dedicated to the trunk. Individual F_PORTs of the trunk group then extract front the dedicated transmit queue and transmit these frames to the node device on an in-order basis from the transmit queue of the trunk.

Furthermore, the node device establishes a destination port identifier for one of its N_PORTs, called a master N_PORT. All F_PORTs of the node device are internally mapped to the master N_PORT. Furthermore, frames arriving at the node device from an end node (e.g., a storage device, host, or virtual machine) and destined for the trunk are routed internally to the transmit queuededicate to the trunk. Individual N_PORTs of the trunk group then extract from the dedicated transmit queue and transmit these frames to the edge switch on an in-order basis from the transmit queue of the trunk.

Using these configurations, loss of one communication link/port in a trunked group between the node device and the edge switch does not require the connected host, storage device, or virtual machine (all of which may be termed an "end node") to re-login to the fabric. Instead, data communications continue through the other still-enabled communications links/ports within the trunk using the same destination port identifier of the master trunk port.

For example, if communications through the current master N_PORT of the node device are disabled, then the node device merely changes its internal mapping of its F_PORTs to a new master N_PORT in the trunk. However, frames continue to be forwarded to the same transmit queue associated with the trunk. If communications through the master N_PORT or a non-master ("slave") N_PORT of the node device is disabled, then that disabled N_PORT's transmit logic merely stops extracting frames from the transmit queue of the trunk in the node device and drops out of the communications, while the other trunked N_PORTs in the node device continue with their communications. In either case, the initiator end nodes connected to the F_PORTs of the node device still send their frames to the same F_PORT identifier, which specifies the Area attributed to the trunked F_PORTs on the edge switch. In this manner, the initiator end nodes are not required to log out and then re-log into the fabric. As such, the communications of the trunked group remains in intact, albeit without the bandwidth previously provided by the disabled communications link/ports.

In contrast, all of the F_PORTs in the edge switch are assigned the same port identifier, and more specifically, the same Area. As such, if communications through the current master F_PORT of the edge switch are disabled, then the edge switch merely designates a new master F_PORT. Nevertheless, whether the master F_PORT or a slave F_PORT is disabled, the internal Area routing of the edge switch need not change—frames can still be forwarded internally to the transmit queue of the trunk in the edge switch and the transmit logic of the still-active transmit F_PORTs in the edge switch continues to extract and allocate the frames among the still-active F_PORTs from the transmit queue of the trunk, in the absence of the disabled F_PORT. As such, the communications of the trunked group remains in intact, albeit without the bandwidth previously provided by the disabled communications link/ports.

The transmit queue logic of both the edge switch and the node device transmit frames in such a way that the frames across the multiple trunked links are received in-order at the other device, despite any skew introduced by differences in transmission times across the individual communication links.

Other implementations are also described and recited herein.

BRIEF DESCRIPTIONS OF THE DRAWINGS

DETAILED DESCRIPTIONS

Figure 1:
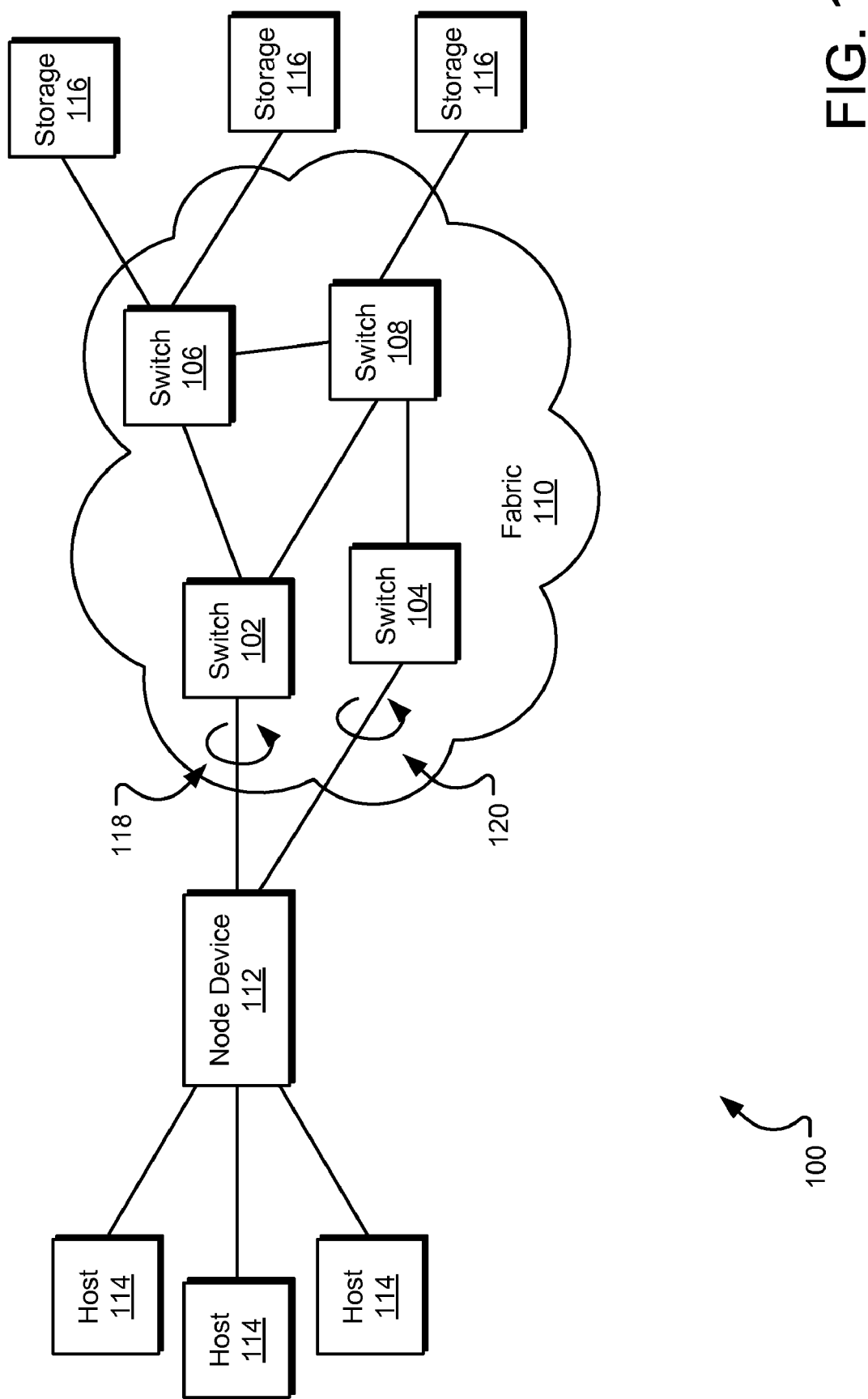
FIG. 1 illustrates an exemplary computing and storage framework including a storage area network (SAN).

FIG. 1 illustrates an exemplary computing and storage framework including a storage area network (SAN). Switches 102, 104, 106, and 108 form a switching fabric 110. The switches 102 and 104 operate as edge switches at the edge of the switching fabric 110 and are operatively connected to a node device 112, which is in turn operatively connected to hosts 114. The switches 106 and 108 also operate as edge switches at the edge of the switching fabric 110 and are operatively connected to storage devices 116. The storage devices 116 and the hosts 114 are generally termed "end nodes" and are connected to a fabric via HBAs and/or virtualization devices. HBAs and virtualization devices are generally termed "node devices" because they present an N_PORT for connection to an F_PORT. It should also be understood that the switching fabric 110 may also include additional switches interconnecting among the switches 102, 104, 106, and 108 in various configurations.

Each switch, storage device, and host, as well as the node device 112, provides multiple communication ports. Each port operates in accordance with a specified signaling protocol, depending on its purpose and connectivity. The ports connecting a communication link between two switches are termed "E_PORTs", and the communication link is termed an "Inter Switch Link" (ISL). Each port of a switch connecting a communication link across a fabric boundary between the switch and a node device outside the fabric 110 (e.g., a storage device 116, a node device 112, a host 114, etc.) is termed an "F_PORT". Each port of a node connecting a communication link across a fabric boundary between the node and a switch is termed an "N_PORT". In this configuration, an F_PORT of a switch in the fabric 110 connects to an N_PORT of a node device outside the fabric 110.

Other types of ports may be employed in relation to a Fibre Channel network, including FL_PORTs, TE_PORTs, and EX_PORTs, in accordance with the Fibre Channel standard, related standards, and draft standards. It should also be understood that the terms N_PORT, F_PORT, and E_PORT identify a type of port employed in relation to a Fibre Channel network. Furthermore, ports complying with the signaling protocol of N_PORTs and F_PORTs may also be implemented outside of the fabric boundary and such ports are also termed N_PORTs and F_PORTs, respectively, as described below with regard to the node device 112.

The edge switch 102 can present F_PORTs or FL_PORTs to the hosts 114 and present E_PORTs, TE_PORTs, or EX_PORTs to other switches in the fabric 110. The edge switch 102 consumes fabric resources, such as domain IDs, and participates in the fabric management and zoning distribution. However, in a configuration such as shown in FIG. 1, where the node device 112 is connected between the edge switch 102 and the hosts 114, the node device 112 is acting as a virtualization device and generally does not consume fabric resources or participate in fabric management and zoning distribution. In such a configuration, the node device 112 presents F_PORTs to the N_PORTs of the HBAs of hosts 114 and N_PORTs to the F_PORTs of the edge switch 102.

As indicated by arrows annotating the connections 118 and 120, each of the connections between the node device 112 and the edge switch 102 consist of multiple trunked communication links (e.g., Fibre Channel cables). That is, each connection 118 and 120 includes multiple communication links that are configured as a trunk, which allows the node device 112 and edge switch 102 to distribute traffic load among the communication links of each trunk. In this manner, the traffic load received at the trunked transmit ports of each device are routed for distribution across the corresponding trunk. By doing so, the traffic load may be distributed over the links of the trunked group in an evenly distributed or load-balancing manner. Moreover, the trunk ensures in-order delivery of frames in an ordered stream to the device at the other end of the trunk.

The node device 112 allows multiple hosts (or host bus adapters or HBAs) to access the fabric 110 using fewer physical F_PORTs within the fabric 110 than would be achievable without virtualization. In the illustrated configuration, the node device 112 is logically transparent to the connected hosts 114 and the fabric 110, multiplexing host connections to the fabric 110 without the hosts or the fabric making any special configuration changes. In one implementation, the node device 112 uses an FC facility called N_PORT ID virtualization (NPIV) that allows multiple N_PORT IDs to share a single N_PORT (e.g., on the node device 112). In this manner, multiple FC initiator nodes (e.g., the hosts 114) can access the fabric 110 via a single N_PORT (or group of trunked N_PORTs) of the node device 112 and a single F_PORT (or group of trunked F_PORTs) of the edge switch (such as edge switch 102). More details regarding example virtualization techniques may be found in U.S. Patent Publication No. 2005/019523A1, entitled ISOLATION SWITCH FOR FIBRE CHANNEL FABRICS IN STORAGE AREA NETWORKS, U.S. patent application Ser. No. 10/767,405, filed Jan. 29, 2005, which is specifically incorporated by reference for all that it discloses and teaches.

Although this description focuses on a node device 112 connected by cabling between edge switches and end node and acting as a virtualization device, it should be understood that a host bus adapter (HBA) or other similar device may also embody a node device, with or without virtualization. Virtualization in an HBA may be employed, for example, to support multiple virtual machines running different operating systems on a single host. Other uses of virtualization may also be applied.

Alternatively, a multiport HBA may also be used to provide increased effective communications speed, link efficiency, and redundancy between an end node and a fabric, independent of any virtualization. For example, a storage device may be equipped with a multi-port HBA to connect to an edge switch in a fabric via multiple communications links. In this configuration, although no virtualization need to be applied, the multi-port HBA can transmit and receive frames of a single communications stream over the multiple communications link via a trunk on an in-order basis. As such, the storage device benefits from improved communication speed from the aggregated bandwidth of the multiple links, improved link efficiency, and improved redundancy. Furthermore, because the storage device need not re-login to the fabric if a communications link is disabled during communications, the communications are not interrupted.

In a typical N_PORT initialization process, each N_PORT of the node device 112 sends an FLOGI to the edge switch 102 to log the host 114 into the fabric 110 and obtain a valid N_PORT ID, provided via an FLOGI ACC response from the edge switch 102. Then, each N_PORT sends a PLOGI to the edge switch 102 to register the valid N_PORT ID with a name server of the fabric 110. In one implementation (e.g., in which the node device 112 includes a discrete device cabled between one or more end nodes and the fabric 110), the PLOGI identifies the master N_PORT and the node device's F_PORT that is connected to the originating end node. In another implementation (e.g., in which the node device 112 includes an HBA that supports multiple virtual machines), the PLOGI identifies the master N_PORT and the F_PORT associated with the originating virtual machine. However, to support NPIV, a N_PORT of the node device 112, such as a master N_PORT of a trunk, also sends an FDISC to obtain an additional N_PORT ID, another PLOGI to register the additional N_PORT ID with the name server. In this manner, using the multiple N_PORT IDs, the edge switch 102 can uniquely address the single physical N_PORT (or group of trunked N_PORTs) with frames destined for the multiple hosts 114. More details of a virtualization example that may be applied to N_PORT and F_PORT trunking are given in U.S. patent application Ser. No. 10/201,331, entitled "FIBRE CHANNEL VIRTUAL HOST BUS ADAPTER" and filed on Jul. 23, 2002, which is specifically incorporated by reference for all that it discloses and teaches.

In yet another implementation, the node device 112 may embody a multi-port HBA that, independent of virtualization, provides trunking capabilities for a connected end node (e.g., the multi-port HBA connects to a storage device via an internal bus). In such an implementation, the PLOGI identifies the master N_PORT of trunk on the HBA. Frames from the storage device are routed to the transmit queue of the trunk for transmission to the fabric. In this manner, the edge switch 102 can uniquely address the master N_PORT (or group of trunked N_PORTs) with frames destined for the storage device.

As described above, when the node device 112 connects to the edge switch 102, the node device 112 logs its hosts and their N_PORTs into the fabric 110. In addition, a set of transmit ports (and therefore the corresponding connected communication links) are designated as being "trunked". Accordingly, for frames destined for the trunk group, the node device 112 sets up its mapping tables and transmit (TX) queuing logic to internally map F_PORTs in accordance with an identifier of a designated master N_PORT in the trunk of the node device 112. Furthermore, the frames received at the F_PORTs are forwarded to a transmit queue associated with the trunked N_PORTs. The TX queuing logic for all trunked N_PORTs in the trunked group then uses the transmit queue of the trunk to extract frames for transmission, thereby allowing each N_PORT in the trunked group to send frames from the transmit queue associated with the trunk.

The described flow is also operable in the opposite direction. When the node device 112 logs into the fabric 110 through the edge switch 102, the edge switch 102 sets up its routing tables and transmit (TX) queuing logic to cause the set of trunked F_PORTs to use only the transmit queue associated with the trunked transmit F_PORTs. As such, the routing table entries of all other trunked F_PORTs in the device are set up to forward frames destined for the trunked group to the transmit queue of the trunk. The TX queuing logic for all F_PORTs in the trunked group then uses only the transmit queue of the trunk to extract frames for transmission, thereby allowing each F_PORT in the trunked group to send frames from the transmit queue of the trunk.

The TX queuing logic modules of the trunked transmit ports operate to ensure in-order delivery of transmitted frames to the edge switch 102. Furthermore, when the frames are received at the destination device (e.g., the edge switch 102 or the node device 112), the frames are collected in-order in the receive queue of the destination device's trunk and forwarded to an appropriate egress port of the device for transmission to a destination end node, whether through the fabric 110 or not.

Figure 2:
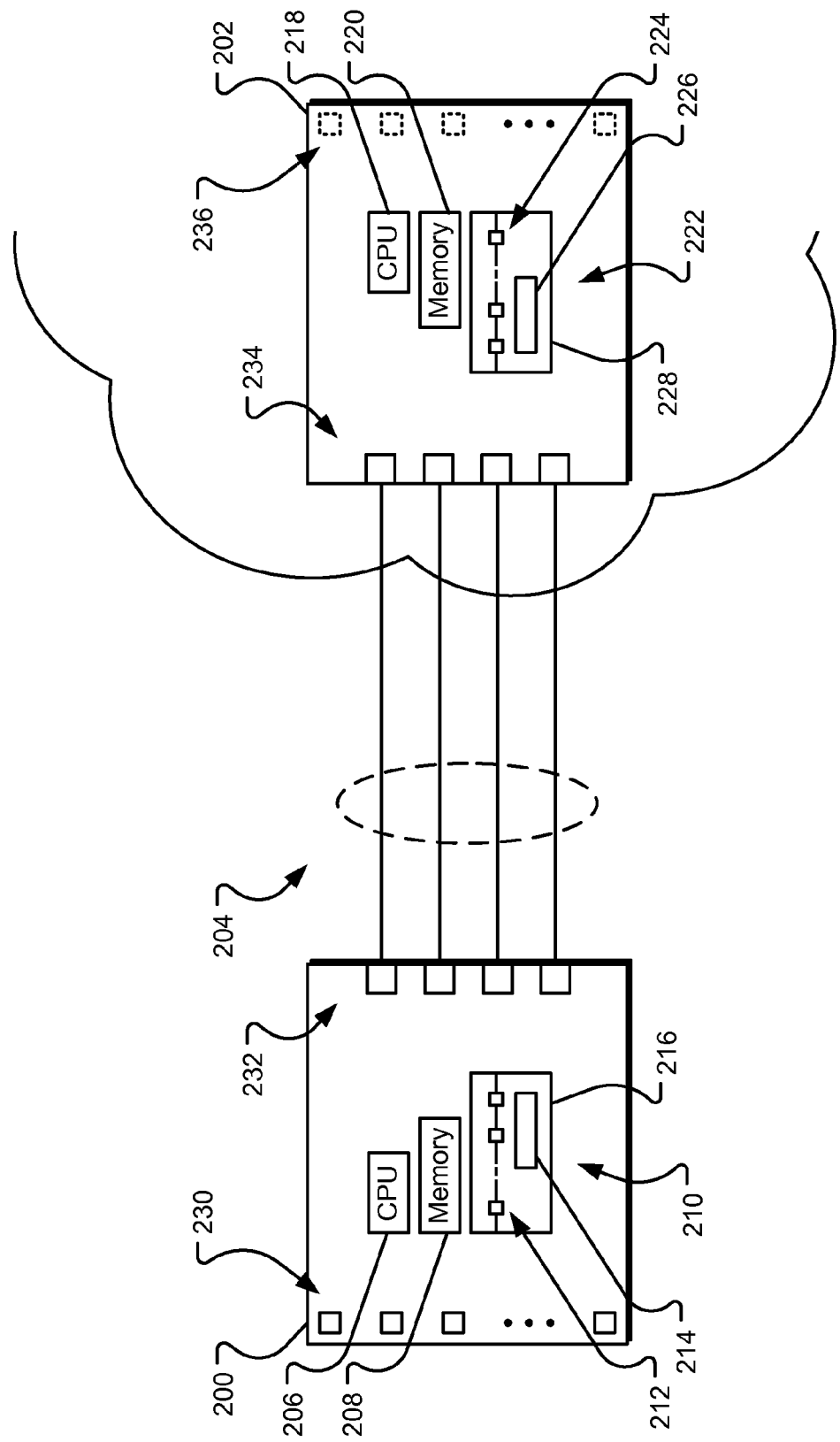
FIG. 2 illustrates additional details of a node device and an edge switch interconnected via trunked communication links.

FIG. 2 illustrates additional details of a node device 200 and an edge switch 202 interconnected via trunked communication links 204. In the illustrated implementation, the node device 200 includes a central processing unit (CPU) module 206 that controls the initialization of the node device 200, although various configurations may be employed. The CPU module 206 typically includes a processor used with a local memory module 208. Additional components 210 can also be included in the node device 200, such as transmit and receive queues 212, a clock timer 214, additional memory, registers, logical routing tables, etc. The additional components are shown as embodied within an Application Specific Integrated Circuit (ASIC) 216 in the node device 200, although other implementations may be employed.

The node device 200 presents F_PORTs 230 for connection to one or more end nodes (not shown). Frames may be received from such nodes through the F_PORTs 230 of the node device 200 and forwarded through the trunked N_PORTs 232 of the node device 200 and the trunked communications links 204 to the edge switch 202. The F_PORTs 230 of the node device 200 map to the master N_PORT identifier of the node device 200 in accordance with a mapping table. Furthermore, the frames received at the F_PORTs 230 are forwarded to a transmit queue associated with the trunk and are then distributed among the trunked N_PORTs 232 for transmission to the edge switch 202.

Although frame traffic has been described in one direction through the node device 200, it should be understood that frame traffic may flow bidirectionally through the node device 200. Accordingly, frames received from the edge switch 202 at the trunked N_PORTs 232 are collected in an in-order manner in a receive queue of the trunk and forwarded to the appropriate F_PORT of the node device 200 for transmission to the appropriate end node.

In the illustrated implementation, the edge switch 202 has a similar configuration as compared to the node device 200, although the two devices may differ in various ways according to their functions. The edge switch 202 includes a CPU module 218 that controls the initialization of the edge switch 202. The CPU module 218 typically includes a processor used with a local memory module 220. As with the node device 200, additional components 222 can also be included in the edge switch 202, such as transmit and receive queues 224, a clock timer 226, additional memory, registers, logical routing tables, etc. The additional components are shown as embodied within an ASIC 228 in the edge switch 202, although other implementations may be employed.

The trunked communications links 204 are connected between N_PORTs 232 of the node device 200 and the F_PORTs 234 of the edge switch 202. Frames may be received from the trunked N_PORTs 232 of the node device 200 across the trunked communication links 204 by the trunked F_PORTs 234 of the edge switch 202 and forwarded through the edge switch 202 through E_PORTs 236 to other switches in the fabric.

Although frame traffic has been described in one direction through the edge switch 202, it should be understood that frame traffic may flow bidirectionally through the edge switch 202. Accordingly, frames received at the E_PORTs 236 route to the trunk queue of the edge switch 202 in accordance with an Area routing table and are then distributed among the trunked F_PORTs 234 for transmission to the trunked N_PORTs 232 of the node device 200.

When the node device 200 is initially connected to the edge switch and initialized, the set of communications links 204 are combined into a trunk group by way of a firmware-driven process. The trunked communications links 204 are coupled to each device by ports 230 and 232. In one implementation, the node device 200 and edge switch 202 then set up their respective mapping/routing tables to identify the port identifier of the master port (e.g., master N_PORT or master F_PORT) and to set up their transmit (TX) queuing logic (e.g., queues 212 and 224) to cause the set of trunked ports of each device to use the transmit queues associated with the trunked ports in each device.

Accordingly, the mapping/routing table entries of other ports on the node device 200 and the edge switch 202 identify a port identifier associated with the trunked group. Furthermore, received frames destined for the trunk are forwarded to a transmit queue associated with the trunk. As such, the TX queuing logic for all ports in the trunked group use the transmit queue of the trunk to determine frame selections (i.e., which frames to send), allowing each port in the trunked group to send any frames from the trunk's transmit queue across any of the communication links in the trunk.

In one implementation, the TX queuing logic of all trunked ports in the transmitting device ensures that frames are delivered in-order to the receive ports of the device on the receive-side of the trunked communication links 204. Absent an effective trunking technology, out-of-order delivery of frames between end-point source and destination ports could occur due to skew between communication links in a trunked group (e.g., the link lengths between each transmit and receiving port pair may differ among links in the trunked communication links 204). To avoid this effect, the trunking logic in the TX queuing logic includes a clock timer 214 that binds a particular queue in the master trunk port to a particular communication link in the trunked group for a time sufficient to ensure "in-order" delivery across multiple communication links. More details of an example deskewing technique that may be applied to N_PORT and F_PORT trunking are given in U.S. patent application Ser. No. 09/872,412, entitled "LINK TRUNKING AND MEASURING LINK LATENCY IN FIBRE CHANNEL FABRIC" and filed on Jun. 1, 2001, which is specifically incorporated by reference for all that it discloses and teaches. The same application also provides additional details regarding handling of master and slaves ports in an example trunking technique.

Figure 3:
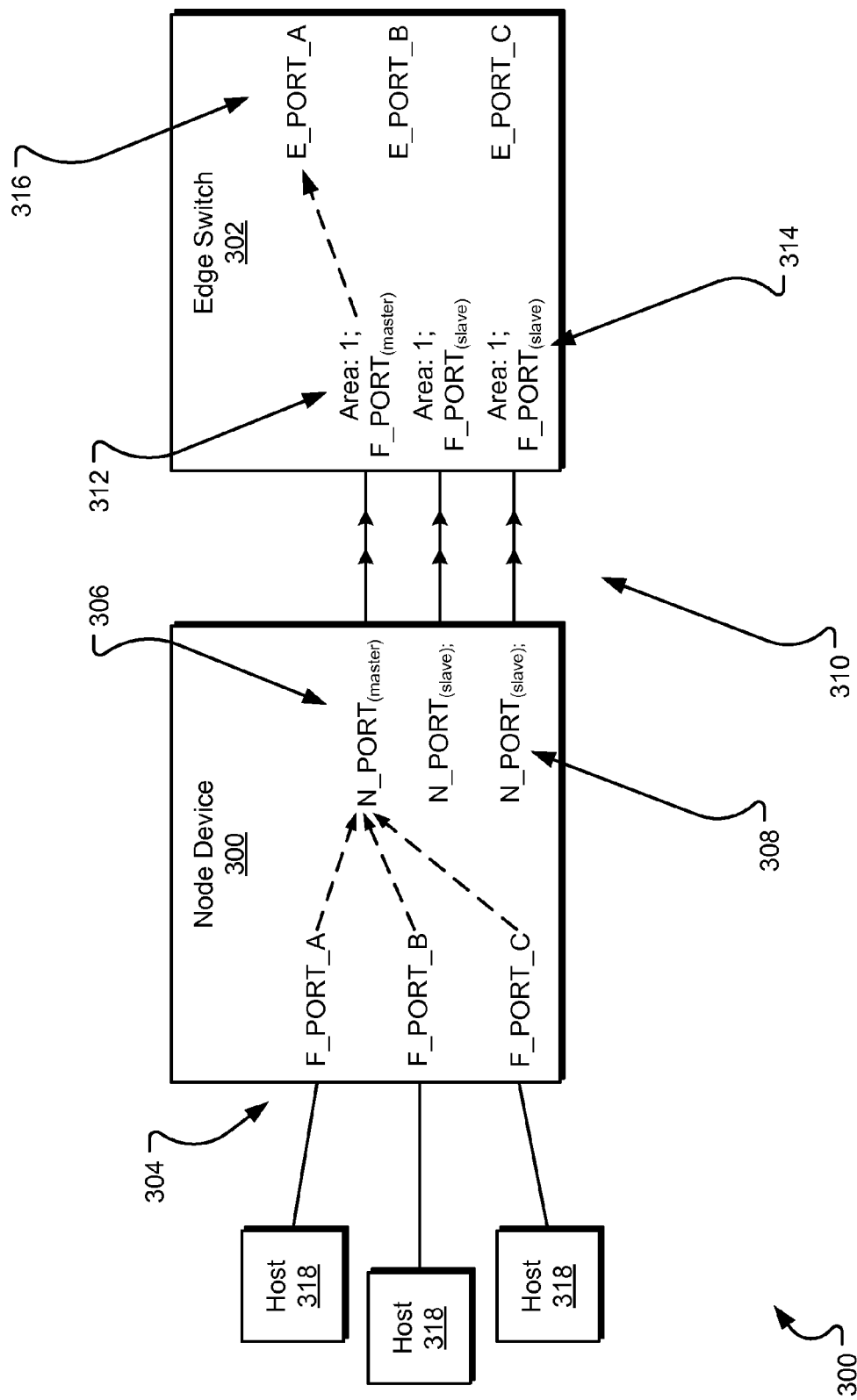
FIG. 3 illustrates example port mappings between a node device and an edge switch interconnected via trunked communication links.

FIG. 3 illustrates example port mappings between a node device 300 and an edge switch 302 interconnected via trunked communication links 310. Hosts 318 (i.e., example end nodes) are connected to F_PORTs 304 of the node device 300. A mapping table of the node device 300 maps each of the F_PORTs to the master N_PORT 306 of the trunked group in the node device 300, and the incoming frames from the hosts 318 are forwarded to a transmit queue associated with the trunked group. The transmit logic of the master N_PORT 306 and the slave N_PORTs 308 extracts the frames from the transmit queue of the trunk and transmits these frames in-order through the trunked communications links 310. Although FIG. 3 only shows 3 pairs of N_PORTs and F_PORTs and only 3 communication links 310, it should be understood that additional slave N_PORT/F_PORT pairs may be present in the trunk, and that all port pairs that are not disabled may continue to transfer frames between the node device 300 and the edge switch 302.

In one implementation, a disabled link (e.g., a disconnected or cut cable) can be detected by the hardware of the node device 300. The hardware notifies the software associated with the affected port via an interrupt. The device's operating system kernel services the interrupt by notifying the port ASIC modules associated with the affected port. If the port is a master port (e.g., as indicated in a register setting in the ASIC or in a configuration datastore), the ASIC module designates a new master port within the trunk. A new master state change notification, containing the old master port and the new master port, is then sent to the node device's application software, which re-maps the appropriate F_PORTs to the new master N_PORT.

The edge switch 302 receives the frames via its master F_PORT 312 and slave F_PORT 314 and collects the frames into a receive queue associated with the trunk in the edge switch 302. The frames are then forwarded from this receive queue through one or more E_PORTs 316 of the edge switch 302.

Figure 4:
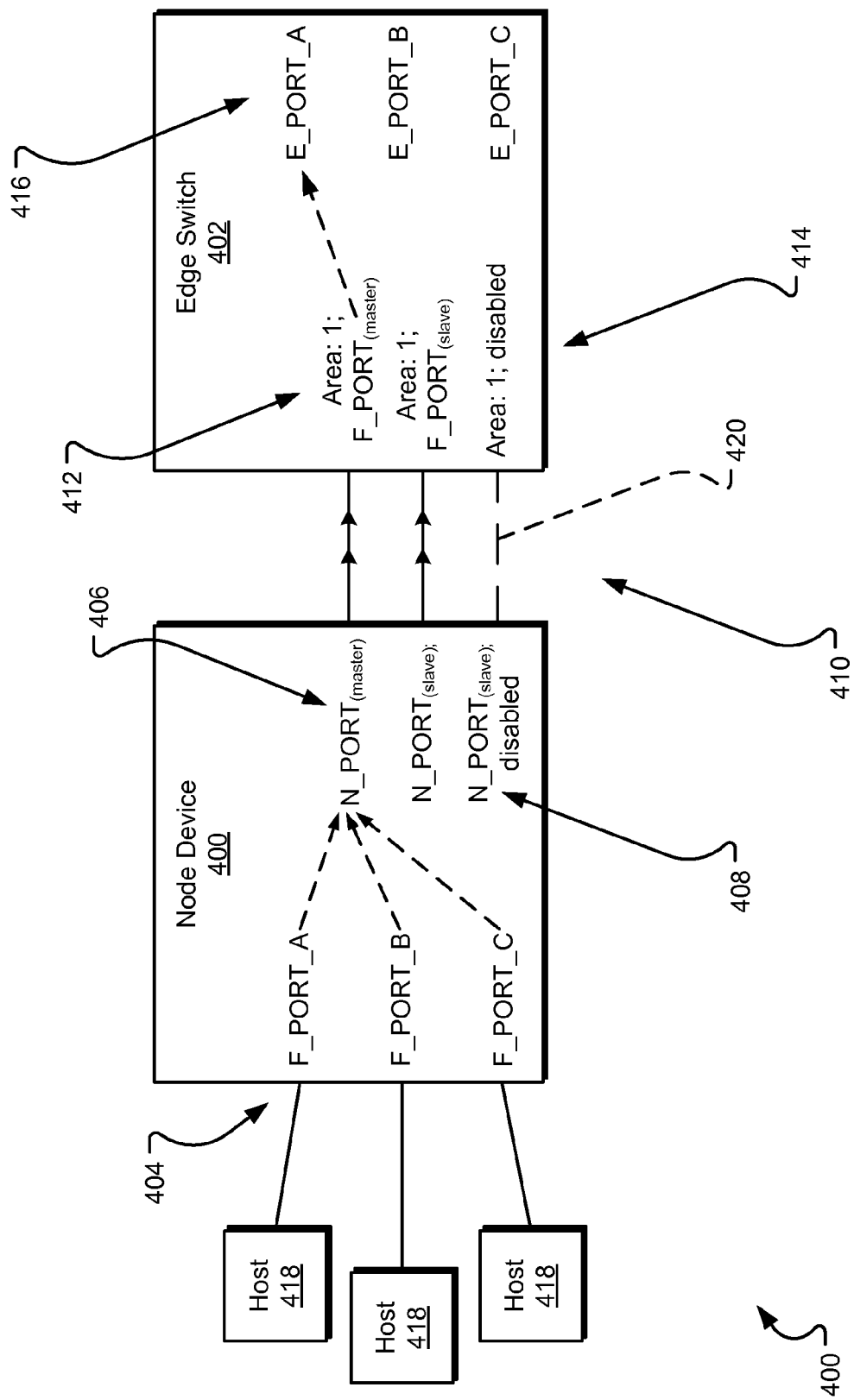
FIG. 4 illustrates example port mappings between a node device and an edge switch interconnected via trunked communication links after disablement of a slave N_PORT in a trunk.

FIG. 4 illustrates example port mappings between a node device 400 and an edge switch 402 interconnected via trunked communication links 410 after disablement of a slave N_PORT in a trunk. Hosts 418 (i.e., example end nodes) are still connected to F_PORTs 404 of the node device 400. The node device 400 has detected that communications via a slave N_PORT 408 have been disabled. A mapping table of the node device 400 still maps each of the F_PORTs 404 to the master N_PORT 406 of the trunked group in the node device 400, and the incoming frames from the hosts 418 are still forwarded to the transmit queue of trunk. The transmit logic of the master N_PORT 406 and other slave N_PORTs (not shown) extracts the frames from the transmit queue of the trunk and transmits these frames in-order through the trunked communications links 410. However, the trunk bandwidth has been reduced through lost of the communications link 420 connected to the disabled slave N_PORT 408. Note: Although FIG. 4 only shows 3 pairs of N_PORTs and F_PORTs and only 3 trunked communication links 410, it should be understood that additional slave N_PORT/F_PORT pairs may be present in the trunk, and that all port pairs that are not disabled may continue to transfer frames between the node device 400 and the edge switch 402.

The edge switch 402 receives the frames via its master F_PORT 412 and other slave F_PORTs and collects the frames into a receive queue associated with the trunk in the edge switch 402. The frames are then forwarded from this receive queue through one or more E_PORTs 416 of the edge switch 402.

Figure 5:
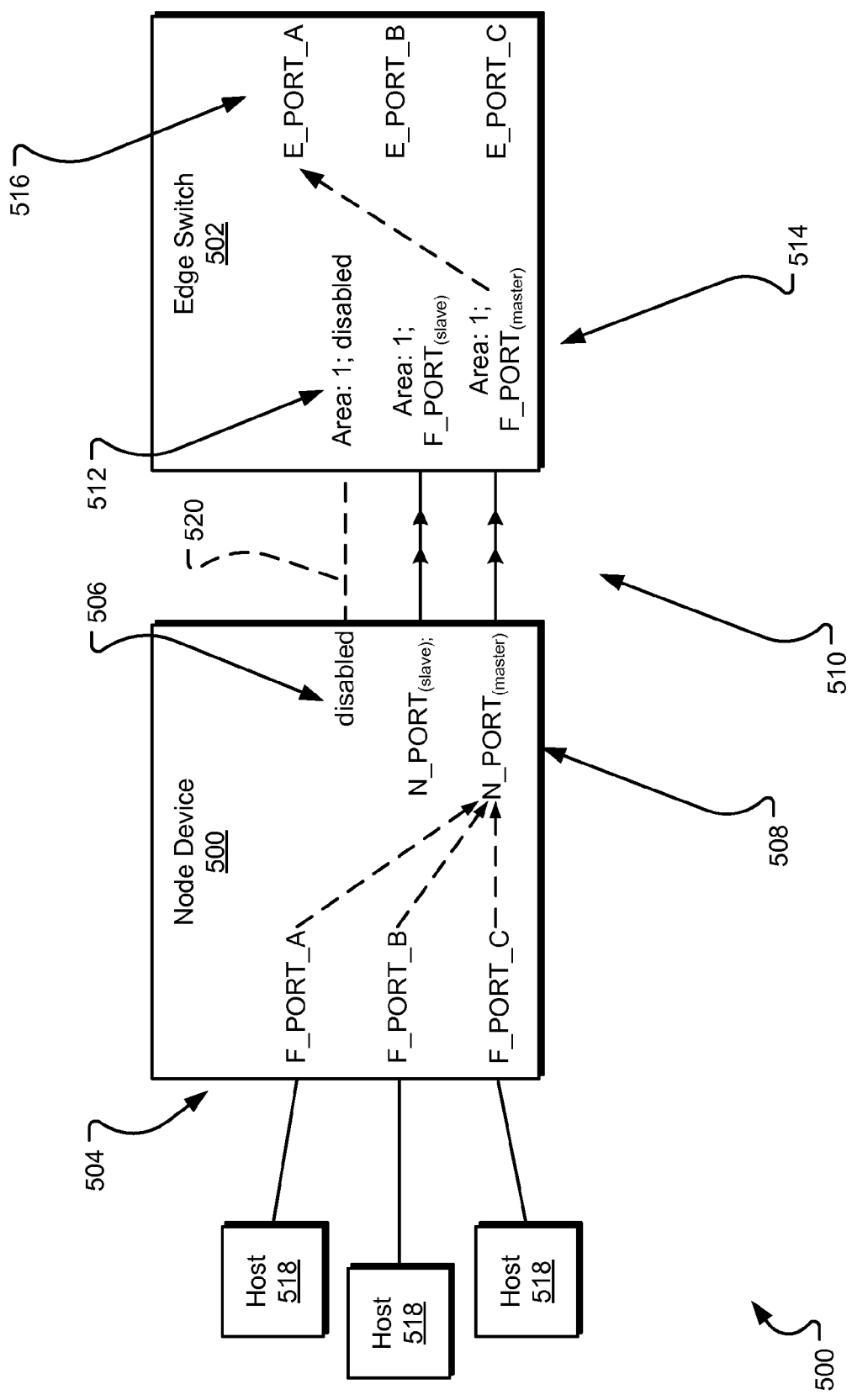
FIG. 5 illustrates example port mappings between a node device and an edge switch interconnected via trunked communication links after disablement of a master N_PORT in a trunk.

FIG. 5 illustrates example port mappings between a node device 500 and an edge switch 502 interconnected via trunked communication links after disablement of a master N_PORT in a trunk. Hosts 518 (i.e., example end nodes) are still connected to F_PORTs 504 of the node device 500. The node device 500 has detected that communications via a master N_PORT 506 have been disabled. As such, a new master N_PORT 508 is designated from those trunked ports that are not disabled. A mapping table of the node device 500 that maps each of the F_PORTs 504 to the master N_PORT 506 of the trunked group in the node device 500 is modified to map each of the F_PORTs 504 to the new master N_PORT 508. The incoming frames from the hosts 518 are still forwarded internally to the transmit queue of the trunk. The transmit logic of the new master N_PORT 508 and other slave N_PORTs (not shown) still extracts the frames from the transmit queue of trunk and transmits these frames in-order through the trunked communications links 510. However, the trunk bandwidth has been reduced through lost of the communications link 520 connected to the disabled N_PORT 506. Note: Although FIG. 5 only shows 3 pairs of N_PORTs and F_PORTs and only 3 trunked communication links 510, it should be understood that additional slave N_PORT/F_PORT pairs may be present in the trunk, and that all port pairs that are not disabled may continue to transfer frames between the node device 500 and the edge switch 502.

The master F_PORT designation is also modified on the edge switch 502, but all incoming frames received via the trunk group are still collected in the receive queue associated with the trunk. As such, the edge switch 502 receives the frames via its new master F_PORT 512 and other slave F_PORT (not shown) and collects the frames into the receive queue of the trunk. The frames are then forwarded from this receive queue through one or more E_PORTs 516 of the edge switch 502.

Figure 6:
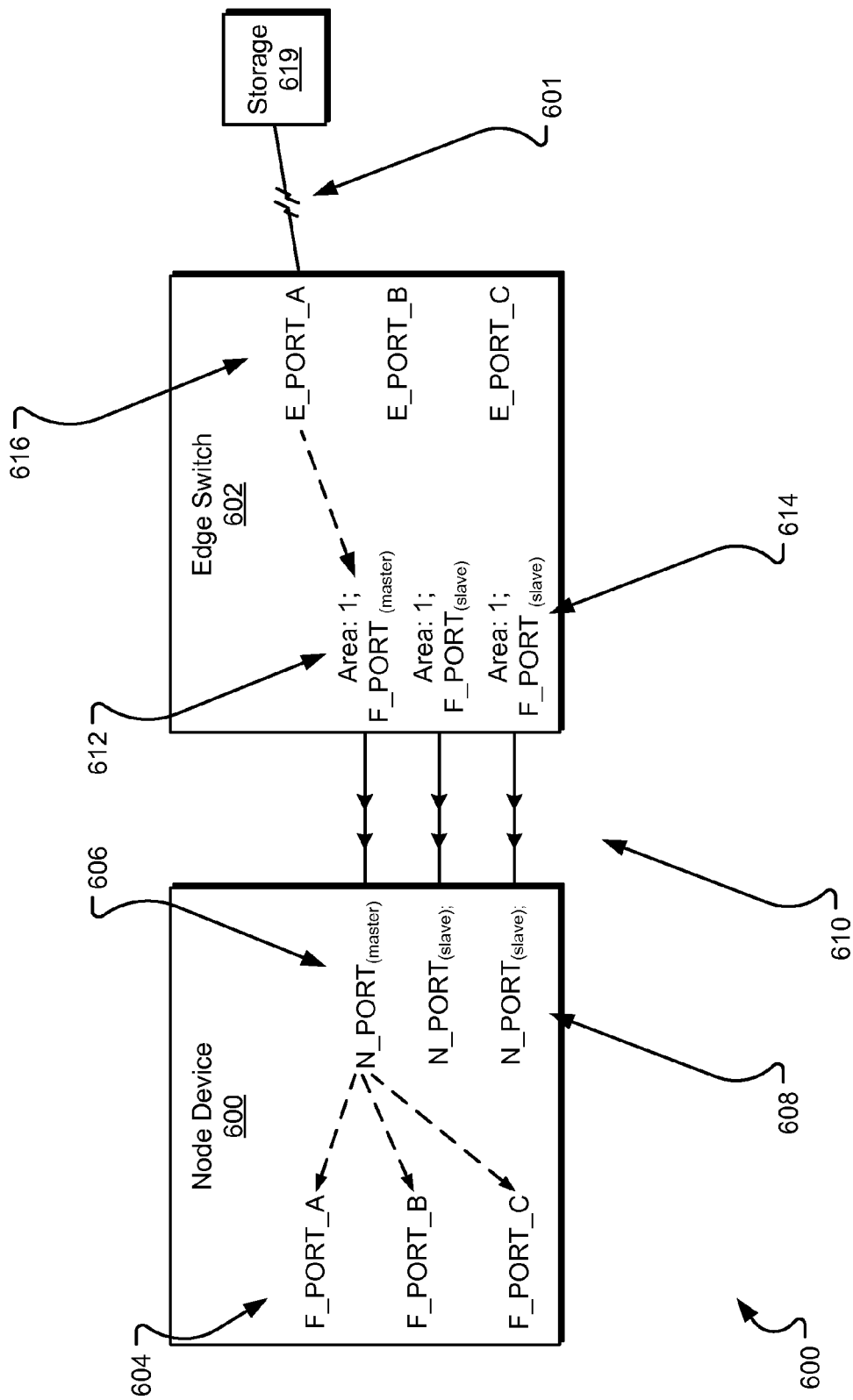
FIG. 6 illustrates example port mappings between a node device and an edge switch interconnected via trunked communication links, in the opposite direction as described with regard to FIG. 3.

FIG. 6 illustrates example port mappings between a node device 600 and an edge switch 602 interconnected via trunked communication links 610, in the opposite direction as described with regard to FIG. 3. A break 601 illustrated in FIG. 6 represents operative connectivity through a fabric. Storage device 619 (i.e., an example end node) is operatively connected through a switching fabric to an E_PORT 616 of the edge switch 602. Internal routing logic uses an Area routing table of the edge switch 602 to forward the incoming frames to a transmit queue associated with the trunked group in the edge switch 602 in accordance with this routing table. The transmit logic of the master F_PORT 612, the slave F_PORT 614, and other slave F_PORTs (not shown) extracts the frames from the transmit queue of the trunk and transmits these frames in-order through the trunked communications links 610. Although FIG. 6 only shows 3 pairs of N_PORTs and F_PORTs and only 3 trunked communication links 610, it should be understood that additional slave N_PORT/F_PORT pairs may be present in the trunk, and that all port pairs that are not disabled may continue to transfer frames between the node device 600 and the edge switch 602.

The node device 600 receives the frames via its master N_PORT 606 and slave N_PORT 608 and collects the frames into a receive queue associated with the trunk in the node device 600. The frames are then forwarded from this receive queue through the appropriate F_PORT of the node device 600.

Figure 7:
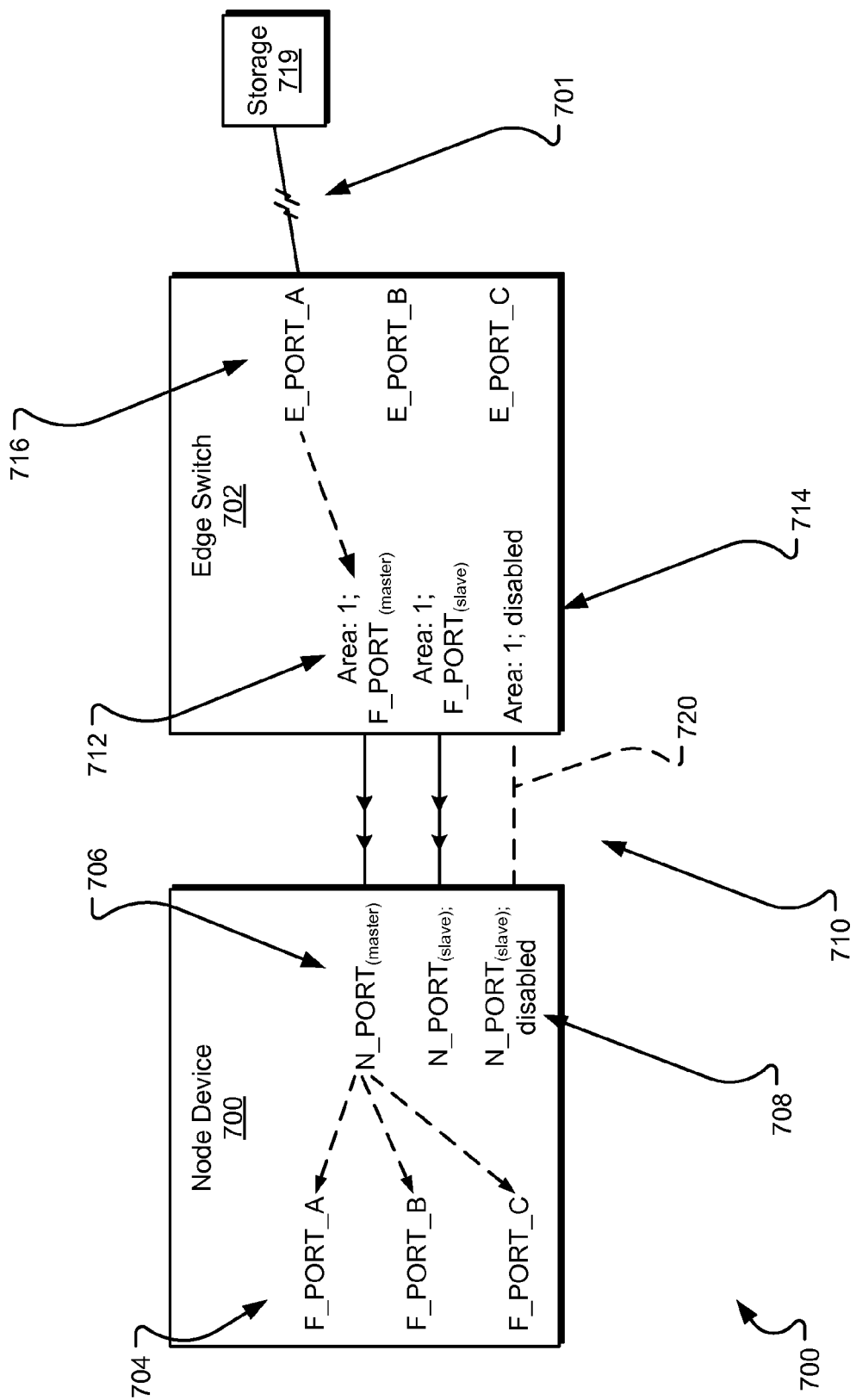
FIG. 7 illustrates example port mappings between a node device and an edge switch interconnected via trunked communication links after disablement of a slave F_PORT in a trunk, in the opposite direction as described with regard to FIG. 4.

FIG. 7 illustrates example port mappings between a node device 700 and an edge switch 702 interconnected via trunked communication links 710 after disablement of a slave F_PORT in a trunk, in the opposite direction as described with regard to FIG. 4. A break 701 illustrated in FIG. 7 represents operative connectivity through a fabric. Storage device 719 (i.e., an example end node) is still operatively connected through a switching fabric to an E_PORT 716 of the edge switch 702. The edge switch 702 has detected that communications via a slave F_PORT 714 have been disabled. Internal routing logic still uses an Area routing table of the edge switch 702 to forward the incoming frames in accordance with the F_PORT identifier associated with the trunked F_PORTs to the transmit queue associated with the trunk group in the edge switch 702. The transmit logic of the master F_PORT 712 and other slave F_PORTs (not shown) extracts the frames from the transmit queue of the trunk and transmits these frames in-order through the trunked communications links 710. However, the trunk bandwidth has been reduced through lost of the communications link 720 connected to the disabled slave F_PORT 714. Note: Although FIG. 7 only shows 3 pairs of N_PORTs and F_PORTs and only 3 trunked communication links 710, it should be understood that additional slave N_PORT/F_PORT pairs may be present in the trunk, and that all port pairs that are not disabled may continue to transfer frames between the node device 700 and the edge switch 702.

In one implementation, a disabled link (e.g., a disconnected or cut cable) can be detected by the hardware of the edge switch 702. The hardware of the edge switch detects an interruption in communications and notifies the software associated with the affected port via an interrupt. The edge switch's operating system kernel services the interrupt by notifying the port ASIC modules associated with the affected port. If the port is a master port (e.g., as indicated in a register setting in the ASIC or in a configuration datastore), the ASIC module designates a new master port within the trunk. A new master state change notification, containing the old master port and the new master port, is then sent to the node device's application software, although no change to the Area routing table need be made.

The node device 700 receives the frames via its master N_PORT 706 and other slave N_PORTs and collects the frames into a receive queue associated with the trunk in the node device 700. The frames are then forwarded from this receive queue through the appropriate F_PORT of the node device 700.

Figure 8:
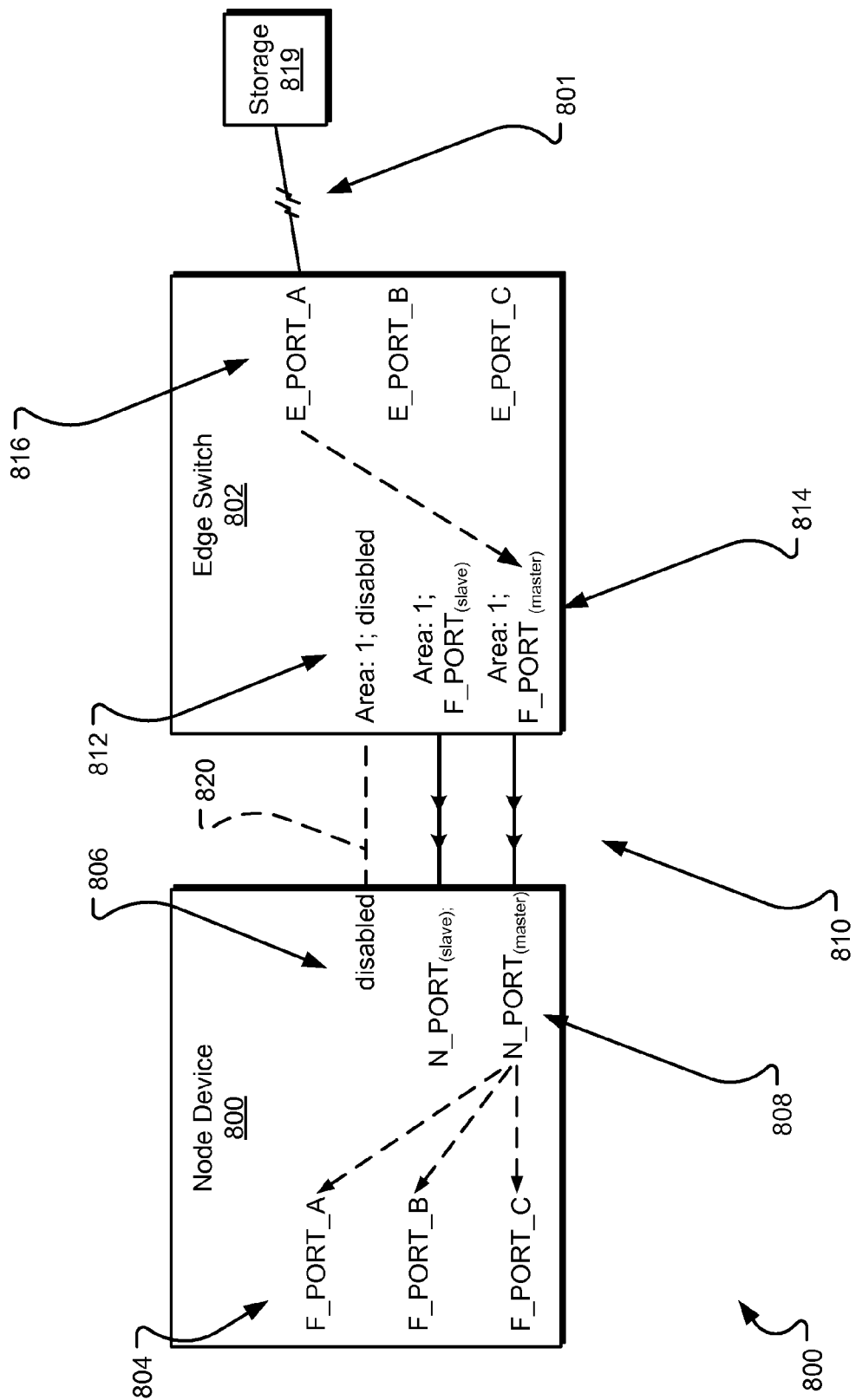
FIG. 8 illustrates example port mappings between a node device and an edge switch interconnected via trunked communication links after disablement of a master trunk F_PORT in a trunk, in the opposite direction as described with regard to FIG. 5.

FIG. 8 illustrates example port mappings between a node device 800 and an edge switch 802 interconnected via trunked communication links after disablement of a master F_PORT in a trunk, in the opposite direction as described with regard to FIG. 5. A break 801 illustrated in FIG. 8 represents operative connectivity through a fabric. A storage device 819 (i.e., an example end node) is still operatively connected through a switching fabric to an E_PORT 816 of the edge switch 802.

The edge switch 802 has detected that communications via the master F_PORT 812 have been disabled. Upon detection of the disablement of the master F_PORT 812, the edge switch 802 designates a new master port. Nevertheless, its internal Area routing need not change—frames can still be forwarded internally to the transmit queue of the trunk in accordance with the shared F_PORT identifier of the trunked F_PORTs and the transmit logic of the still-active and trunked transmit F_PORTs in the edge switch allocate the frames among themselves in the absence of the previous master port. The incoming frames from the storage device 819 are therefore forwarded to the transmit queue of the trunk. The transmit logic of the new master F_PORT 814 and other slave F_PORTs (not shown) still extracts the frames from the transmit queue of the trunk and transmits these frames in-order through the trunked communications links 810. However, the trunk bandwidth has been reduced through loss of the communications link 820 connected to the disabled F_PORT 812. Note: Although FIG. 8 only shows 3 pairs of N_PORTs and F_PORTs and only 3 communication links 810, it should be understood that additional slave N_PORT/F_PORT pairs may be present in the trunk, and that all port pairs that are not disable may continue to transfer frames between the node device 800 and the edge switch 802.

The master N_PORT designation is also modified on the node device 800, but all incoming frames received via the trunk group are still collected in the receive queue associated with the trunk in the node device 800. As such, the node device 800 receives the frames via its new master N_PORT 808 and other slave N_PORT (not shown) and collects the frames into the receive queue of the trunk. The frames are then forwarded from this receive queue through the appropriate F_PORT of the node device 800.

Figure 9:
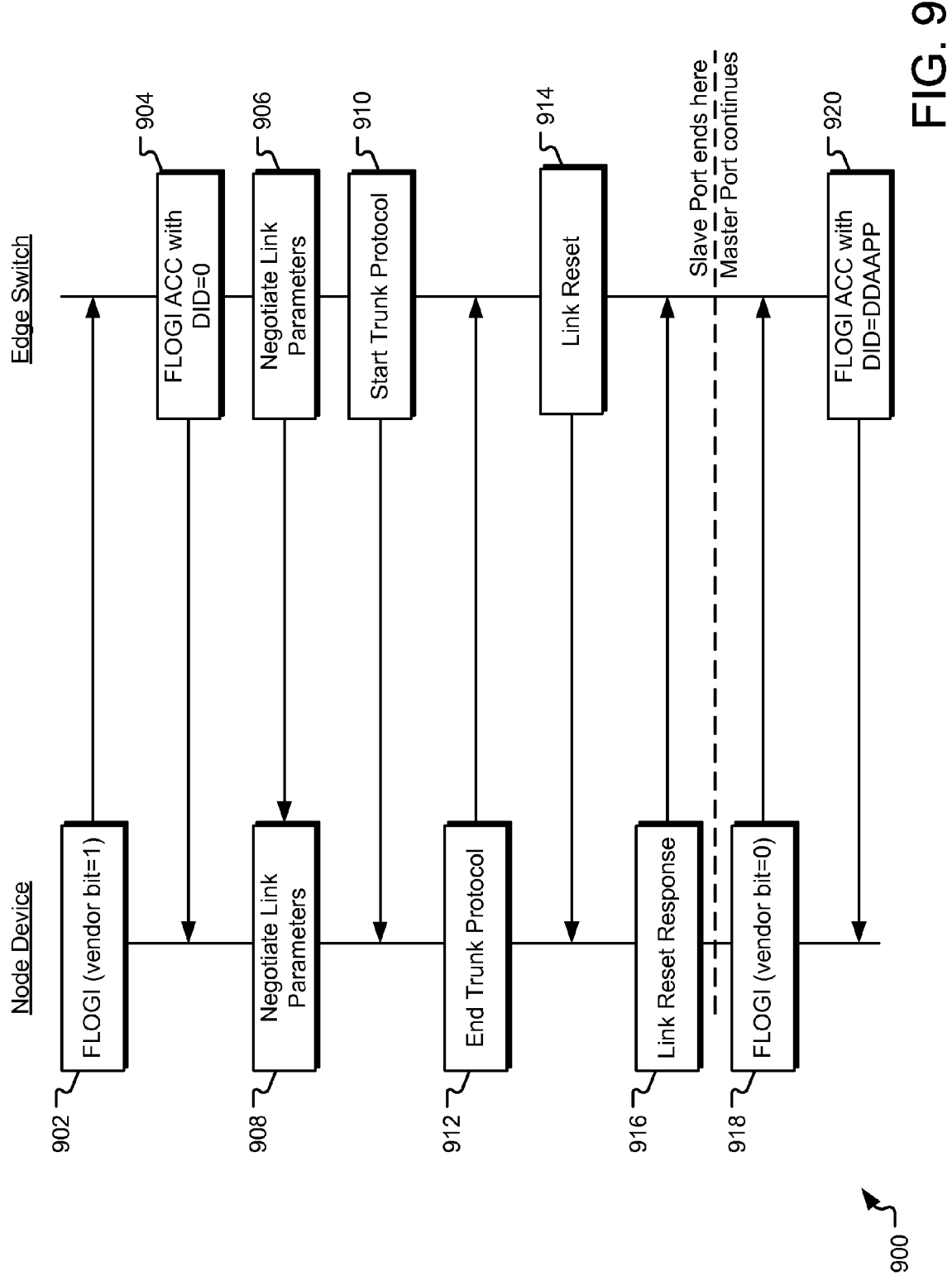
FIG. 9 illustrates example communications/operations between a node device and an edge switch for initializing F_PORT trunking.

FIG. 9 illustrates example communications/operations 900 between a node device and an edge switch for initializing F_PORT trunking. A node device connects to an edge switch with communications flowing back and forth between the two devices via one or more communications links connected to device ports. In one implementation, operations 902, 904, 906, 908, 910, 912, 914, and 916 are performed by all of the ports (i.e., master and slave) in the trunk groups, and then the master ports only need perform operations 918 and 920.

In a login operation 902, N_PORTs of the node device transmits a request to the edge switch requesting support for port trunking (e.g., a fabric login request (FLOGI) with the vendor bit set to 1, in one implementation). In one implementation, the vendor bit may be implemented as bit 29 (Valid Vendor Version) of the second word of the Common Service Parameters of the FLOGI Payload, although other implementations and standards may be employed. In an acceptance operation 904, if the edge switch supports port trunking, the edge switch responds to indicate this (e.g., with a fabric login acceptance (FLOGI ACC) with the destination port identifier (DID) set to zero). In exchange operations 906 and 908, the edge switch and the node device negotiate exchange link parameters (ELPs) to establish a link between the corresponding ports of each device. A trunk initialization operation 910 in the edge switch starts a trunking protocol with the node device. A trunking protocol completion operation 912 in the node device ends the trunking protocol with the edge switch.

A reset operation 914 sends a link reset comment from the edge switch to the node device. A response operation 916 sends a link reset response from the node device to the edge switch.

In one implementation, after the link reset operations, slave port communications in the initialization process end here and only the master ports continue for the last pair of communications. In another login operation 918, the node device issues another fabric login request (FLOGI) with the vendor bit set to 0. In an acceptance operation 920, the edge switch responds with a fabric login acceptance indicating a destination port identifier (DID) shared by all of the trunked F_PORTs in the edge switch. In one implementation, this destination takes the form of "DDAAPP" where "DD" represents a Domain identifier, "AA" represents an Area identifier, and "PP" represents a Port identifier. Nevertheless, as noted previously, all of the trunked F_PORTs share the same DID, preventing other subsequent fabric logins from being executed at a trunked F_PORT.

The embodiments of the invention described herein are implemented as logical steps in one or more computer systems. The logical operations of the present invention are implemented (1) as a sequence of processor-implemented steps executing in one or more computer systems and (2) as interconnected machine or circuit modules within one or more computer systems. The implementation is a matter of choice, dependent on the performance requirements of the computer system implementing the invention. Accordingly, the logical operations making up the embodiments of the invention described herein are referred to variously as operations, steps, objects, or modules. Furthermore, it should be understood that logical operations may be performed in any order, unless explicitly claimed otherwise or a specific order is inherently necessitated by the claim language.

The above specification, examples and data provide a complete description of the structure and use of exemplary embodiments of the invention. Since many embodiments of the invention can be made without departing from the spirit and scope of the invention, the invention resides in the claims hereinafter appended. Furthermore, structural features of the different embodiments may be combined in yet another embodiment without departing from the recited claims.

What is claimed is:

1. A method comprising:
    connecting physical communication ports of an edge switch via a trunk formed of two or more parallel physical communication links to physical communication ports of a node device, with one physical communication port of the edge switch and one physical communication port of the node device per physical communication link within the trunked parallel physical communication links, wherein each of the trunk-connected physical communication ports of the edge switch is configured as a type of F_PORT and the each of the trunk-connected physical communication ports of the node device is configured as a type of N_PORT, so that there are two or more physical F_PORTs on the edge switch and two or more physical N_PORTs on the node device, with the physical F_PORTs of edge device being in parallel and the physical N_PORTs of the node device being in parallel; and
    communicating a frame stream on an in-order delivery basis across a plurality of the two or more trunked parallel physical communication links in the trunk between the trunk-connected physical F_PORTs of the edge switch and the trunk-connected physical N_PORTs of the node device.

2. The method of claim 1 further comprising:
    if communications via a trunk-connected physical F_PORT of the edge switch is disabled, ceasing extraction of frames of the frame stream from a shared transmit queue by the disabled trunk-connected physical F_PORT of the edge switch, while maintaining extraction of frames of the frame stream from the shared transmit queue by still-enabled trunk-connected physical F_PORTs of the edge switch.

3. The method of claim 1 further comprising:
if communications via a trunk-connected physical N_PORT of the node device are disabled, ceasing extraction of frames of the frame stream from a shared transmit queue by the disabled trunk-connected physical N_PORT of the node device, while maintaining extraction of frames of the frame stream from the shared transmit queue by still-enabled trunk-connected physical N_PORTs of the node device.

4. The method of claim 1 further comprising:
if communications via an N_PORT of the node device mapped to a trunk-connected physical N_PORT of the node device designated as a master communications port of the node device are disabled, designating a new master communication port among the still-enabled trunk-connected physical N_PORTs of the node device and remapping the N_PORTs of the node device to the new master communication port of the node device.

5. The method of claim 1 further comprising:
if communications via at least one of the trunk-connected physical F_PORTs of the edge switch are disabled, designating a new master communication port among the still-enabled trunk-connected physical F_PORTs of the edge switch.

6. An edge switch comprising:
a plurality of physical communication ports configured for connection via a trunk formed of two or more parallel physical communication links to physical communication ports of a node device, with one of the plurality of physical communication ports per physical communication link within the trunked parallel physical communication links, wherein each of the trunk-connected physical communication ports of the edge switch is configured as a type of F_PORT and each of the trunk-connected physical communication ports of the node device is configured as a type of N_PORT, so that there are two or more physical F_PORTs on the edge switch and two or more physical N_PORTs on the node device, with the physical F_PORTs of edge device being in parallel and the physical N_PORTs of the node device being in parallel; and
transmit logic coupled to the plurality of trunk-connected physical F_PORTs of the edge switch that communicates a frame stream on an in-order delivery basis across a plurality of the two or more trunked parallel physical communication links in the trunk between the trunk-connected physical F_PORTs of the edge switch and the trunk-connected physical N_PORTs of the node device.

7. The edge switch of claim 6, wherein the transmit logic of the edge switch further being configured to cease extraction of frames of the frame stream from a shared transmit queue by a disabled trunk-connected physical F_PORT of the edge switch, responsive to detection of disabled communications via the disabled trunk-connected physical F_PORT of the edge switch.

8. The edge switch of claim 6, wherein the transmit logic of the edge switch further being configured to designate a new master communication port among still-enabled trunk-connected physical F_PORTs of the edge switch, responsive to detection of disabled communications via at least one of the trunk-connected physical F_PORTs of the edge switch designated as a master communication port.

9. A node device comprising:
a plurality of physical communication ports configured for connection via a trunk formed of two or more parallel physical communication links to physical communication ports of an edge switch, with one of the plurality of communication ports per physical communication link within the trunked parallel physical communication links, wherein each of the trunk-connected physical communication ports of the node device is configured as a type of N_PORT and the each of the trunk-connected physical communication ports of the edge switch is configured as a type of F_PORT, so that there are two or more physical F_PORTs on the edge switch and two or more physical N_PORTs on the node device, with the physical F_PORTs of edge device being in parallel and the physical N_PORTs of the node device being in parallel; and
transmit logic coupled to the plurality of trunk-connected physical N_PORTs of the node device that communicates a frame stream on an in-order delivery basis across a plurality of the two or more trunked parallel physical communication links in the trunk between the trunk-connected physical F_PORTs of the edge switch and the trunk-connected physical N_PORTs of the node device.

10. The node device of claim 9 wherein the transmit logic further being configured to cease extraction of frames of the frame stream from a shared transmit queue by the at least one of the trunk-connected physical N_PORTs of the node device, responsive to detection of disabled communications via at least one of the trunk-connected physical N_PORTs of the node device.

11. The node device of claim 9 wherein the transmit logic further being configured to:
if communications via an N_PORT of the node device mapped to a trunk-connected physical N_PORT of the node device designated as a master communication port of the node device are disabled, designate a new master communication port among the still-enabled trunk-connected physical N_PORTs of the node device; and
remap the N_PORTs of the node device to the new master communication port of the node device.

12. A method comprising:
receiving a first fabric login request from a node device having trunked physical communication ports connected via a trunk formed of two or more parallel physical communication links to trunked physical communication ports of an edge switch, with one trunked physical communication port of the edge switch and one trunked physical communication port of the node device per physical communication link within the trunked parallel physical communication links, the first fabric login request requesting support for port trunking by the edge switch;
sending a first fabric login acceptance from the edge switch to the node device, responsive to the operation of receiving the first fabric login request, the first fabric login acceptance indicating support for port trunking by the edge switch;
receiving a second fabric login request from the node device, after the operation of sending the first fabric login acceptance; and
sending a second fabric login acceptance from the edge switch to the node device indicating a destination port identifier shared by the trunked physical communication ports of the edge switch, responsive the operation of receiving the second fabric login request
wherein the operations of receiving a second fabric login request and sending a second fabric login acceptance are performed only by a master trunk port of the edge switch.

13. The method of claim 12 wherein the edge switch is a Fibre Channel switch and the trunked physical communication ports of the edge switch are F_PORTs.

14. The method of claim 12 wherein the node device is a host bus adapter and the trunked physical communication ports of the node device are N_PORTS.

15. The method of claim 12 wherein the node device is connected to the edge switch by multiple Fibre Channel cables via the trunked physical communication ports operating as N_PORTs and to multiple end nodes by multiple Fibre Channel cables via physical communication ports operating as F_PORTs.

16. The method of claim 12 wherein the first fabric login request includes a vendor bit set to one to request support for port trunking by the edge switch.

17. The method of claim 12 wherein the first fabric login acceptance includes a destination port identifier set to zero to indicate support for port trunking by the edge switch.

18. The method of claim 12 wherein the first fabric login request includes a vendor bit set to one to request support for port trunking by the edge switch, the first fabric login acceptance includes a destination port identifier set to zero to indicate support for port trunking by the edge switch, and the second fabric login request includes a vendor bit set to zero.

19. The method of claim 12 further comprising:
negotiating exchange link parameters between the edge switch and the node device after the operation of sending the first fabric login acceptance and before the operation of receiving the second fabric login request.

20. The method of claim 12 further comprising:
executing a trunking protocol between the edge switch and the node device after the operation of sending the first fabric login acceptance and before the operation of receiving the second fabric login request.

21. The method of claim 12 further comprising:
sending a link reset request to the node device after the operation of sending the first fabric login acceptance and before the operation of receiving the second fabric login request.

22. The method of claim 12 further comprising:
sending a link reset request to the node device; and
receiving a link reset response from the node device after the operation of sending the link reset request and before the operation of receiving the second fabric login request.

23. An edge switch comprising:
F_PORTs configured to connect to trunked N_PORTs of a node device via a trunk formed of two or more parallel physical communication links, with one of the F_PORTs and one of the trunked N_PORTs per physical communication link within the trunked parallel physical communication links, with one F_PORT configured to be a master trunk port, at least one of the F_PORTs being configured to:
receive a first fabric login request from the node device, the first fabric login request requesting support for port trunking by the edge switch;
send a first fabric login acceptance from the edge switch to the node device, after receiving the first fabric login request, the first fabric login acceptance indicating support for port trunking by the edge switch;
receive a second fabric login request from the node device, after sending the first fabric login acceptance; and
send a second fabric login acceptance from the edge switch to the node device indicating a destination port identifier shared by the trunked F_PORTs of the edge switch, after receiving the second fabric login request; and
transmit logic coupled to the plurality of trunk-connected F_PORTs of the edge switch that communicates a frame stream on an in-order delivery basis across a plurality of the two or more trunked parallel physical communication links in the trunk between the trunk-connected F_PORTs of the edge switch and the trunk-connected N_PORTs of the node device,
wherein the operations of receiving a second fabric login request and sending a second fabric login acceptance are performed only by the master trunk port of the edge switch.

24. The edge switch of claim 23 further comprising:
a transmit queue dedicated for use by the trunk-connected F_PORTs of the edge switch, wherein each trunk-connected F_PORT of the edge switch extracts frames of the frame stream from the transmit queue, the transmit logic of the edge switch further being configured to detect that communications via a trunk-connected F_PORT of the edge switch are disabled and to cease extraction of frames of the frame stream from the transmit queue by the disabled trunk-connected F_PORT of the edge switch, responsive to detection of the disabled communications.

25. A method comprising:
sending a first fabric login request from a node device to an edge switch having trunked physical communication ports connected via a trunk formed of two or more parallel physical communication links to trunked physical communication ports of the node device, with one trunked physical communication port of the edge switch and one trunked physical communication port of the node device per physical communication link within the trunked parallel physical communication links, the first fabric login request requesting support for port trunking by the edge switch;
receiving a first fabric login acceptance from the edge switch, responsive the operation of sending the first fabric login request, the first fabric login acceptance indicating support for port trunking by the edge switch;
sending a second fabric login request from the node device to the edge switch, after the operation of receiving the first fabric login acceptance;
receiving a second fabric login acceptance from the edge switch indicating a destination port identifier shared by the trunked physical communication ports of the edge switch, responsive the operation of sending the second fabric login request,
wherein the operations of sending a second fabric login request and receiving a second fabric login acceptance are performed only by a master trunk port of the node device.

26. The method of claim 25 wherein the edge switch is a Fibre Channel switch and the trunked physical communication ports of the edge switch are F_PORTs.

27. The method of claim 25 wherein the node device is a host bus adapter and the trunked physical communication ports of the node device are N_PORTS.

28. The method of claim 25 wherein the node device is connected to the edge switch by multiple Fibre Channel cables via the trunked physical communication ports operating as N_PORTs and to multiple end nodes by multiple Fibre Channel cables via physical communication ports operating as F_PORTs.

29. The method of claim 25 wherein the first fabric login request includes a vendor bit set to one to request support for port trunking by the edge switch.

30. The method of claim 25 wherein the first fabric login acceptance includes a destination port identifier set to zero to indicate support for port trunking by the edge switch.

31. The method of claim 25 wherein the first fabric login request includes a vendor bit set to one to request support for port trunking by the edge switch, the first fabric login acceptance includes a destination port identifier set to zero to indicate support for port trunking by the edge switch, and the second fabric login request includes a vendor bit set to zero.

32. The method of claim 25 further comprising:
negotiating exchange link parameters between the edge switch and the node device after the operation of receiving the first fabric login acceptance and before the operation of sending the second fabric login request.

33. The method of claim 25 further comprising:
executing a trunking protocol between the edge switch and the node device after the operation of receiving the first fabric login acceptance and before the operation of sending the second fabric login request.

34. The method of claim 25 further comprising:
sending a link reset request to the node device after the operation of receiving the first fabric login acceptance and before the operation of sending the second fabric login request.

35. The method of claim 25 further comprising:
receiving a link reset request;
sending a link reset response to the edge switch after the operation of receiving the link reset request and before the operation of sending the second fabric login request.

36. The method of claim 25 wherein one of the physical communication ports of the node device is designated as a master trunk port and further comprising:
if communication via the master trunk port has been disabled, designating a different physical communication port of the node device as a new master trunk port in the node device;
modifying a mapping table of the node device to map to the new master trunk port in the node device.

37. A node device comprising:
N_PORTs configured to connect to trunked F_PORTs of an edge switch via a trunk formed of two or more parallel physical communication links, with one of the trunked F_PORTs and one of the N_PORTs per physical communication link within the trunked parallel physical communication links, with one N_PORT configured to be a master trunk port, at least one of the N_PORTs being configured to:
send a first fabric login request from the node device to the edge switch, the first fabric login request requesting support for port trunking by the edge switch;
receive a first fabric login acceptance from the edge switch, after sending the first fabric login request, the first fabric login acceptance indicating support for port trunking by the edge switch;
send a second fabric login request from the node device to the edge switch, after receiving the first fabric login acceptance; and
receive a second fabric login acceptance from the edge switch indicating a destination port identifier shared by the trunked F_PORTs of the edge switch, after sending the second fabric login request; and
transmit logic coupled to the plurality of trunk-connected N_PORTs of the node device that communicates a frame stream on an in-order delivery basis across a plurality of the two or more trunked parallel physical communication links in the trunk between the trunk-connected F_PORTs of the edge switch and the trunk-connected N_PORTs of the node device,
wherein the operations of sending a second fabric login request and receiving a second fabric login acceptance are performed only by the master trunk port of the node device.

38. The node device of claim 37 further comprising:
a transmit queue dedicated for use by the trunk-connected N_PORTs of the node device, wherein each trunk-connected N_PORT of the node device extracts frames of the frame stream from the transmit queue, the transmit logic of the node device further being configured to detect that communications via a trunk-connected N_PORT of the node device are disabled and to cease extraction of frames of the frame stream from the shared transmit queue by the disabled trunk-connected N_PORT of the node device, responsive to detection of the disabled communications.

* * * * *